United States Patent [19]

Roling

[11] 4,224,648
[45] Sep. 23, 1980

[54] DISC CENTERING

[75] Inventor: William J. Roling, Richfield, Minn.

[73] Assignee: Control Data Corporation, Minneapolis, Minn.

[21] Appl. No.: 951,904

[22] Filed: Oct. 16, 1978

[51] Int. Cl.³ .......................... G11B 5/82; G11B 25/04
[52] U.S. Cl. .......................................... 360/97; 360/135
[58] Field of Search ...................................... 360/97–99, 360/133, 135, 86; 358/128; 346/137

[56] References Cited

U.S. PATENT DOCUMENTS

| | | | |
|---|---|---|---|
| 3,706,085 | 12/1972 | Mowrey et al. | 360/97 |
| 3,980,308 | 9/1976 | Camerik et al. | 340/137 |

*Primary Examiner*—John H. Wolff
*Attorney, Agent, or Firm*—Frederick W. Niebuhr

[57] ABSTRACT

An apparatus is disclosed for centering one or more magnetic discs on a rotatable spindle. The apparatus includes a disc-carrying hub having a circumferential collar, a central housing supporting a centering ball, and a diaphragm joining the collar and housing, stiff in the radial direction but allowing axial movement of the centering element with respect to the collar. The hub is attracted to a rotatable spindle by an annular permanent magnet mounted on the spindle opposite a similarly sized armature mounted on the hub. A cup formed in the spindle at its center receives the centering ball and guides it to the center of the spindle as the hub is attracted to the spindle. After the centering ball is seated in the center of the cup, the diaphragm flexes to allow continued axial movement of the collar to full engagement with the spindle. A second embodiment of the apparatus is a tool for centering a disc pack on a spindle, wherein shoulder screws extend through the tool and threadedly engage the spindle, to provide a hub-spindle attractive force in lieu of the magnet.

22 Claims, 8 Drawing Figures

DISC CENTERING

BACKGROUND OF THE INVENTION

This invention relates to memory devices including the discs and disc packs.

A flat and circular disc coated with a magnetic recording material is a common type of memory device in computers. A single disc attached to a hub can be rotatably mounted on a spindle through the hub, or a plurality of discs can be mounted on the spindle as a disc module or pack. In either case, a magnetic head is supported near the disc and is movable radially thereof. Radial translation of the head, together with rotation of the disc, permits selective positioning of the head on the disc surface for reading or recording data.

In the case of a single disc mounted on a hub, it is often desirable to have interchangeability of single disc-hub assemblies on the same drive spindle. To insure convenience of changiang discs, an annular permanent magnetic mounted on the spindle is used to attract a correspondingly shaped and sized armature plate mounted to the aluminum hub carrying the disc. Attraction between the magnet and armature plate maintains the hub against the spindle. In order to center the hub on the spindle, a female truncated cone is formed in the prior art hub and adapted to center itself on a corresponding male truncated cone at the center of the spindle. A diaphragm between the hub cone and periphery is sufficiently bendable so that ideally, after the two cones are completely engaged, some continued flexure takes place permitting joining of the hub periphery and spindle periphery.

Due to the minute spacing between adjacent data tracks on the disc recording surface, extremely accurate initial centering and repeatability of centering are vital to proper recording and reading on the disc. Accuracy is impaired as the magnetic force can cause the disc to be pulled to the spindle at the periphery before proper centering. This problem is recognized in U.S. Pat. No. 3,706,085 to Mowrey granted Dec. 12, 1972 in which the proffered solution is the replacement of the spindle permanent magnet with an electromagnet to be energized after the centers are fit together. The premature off-center joinder can cause dents and nicks in the aluminum cast female cone of the hub due to sharp edges of the male cone and also from any foreign particles trapped between the two cones. Moreover, as damage could result from even a minor mismatch in size, extremely accurate machining of the two cones is required.

A further impediment to accurate centering results from the manner in which the aluminum hub is manufactured. Typically, this hub is die cast and then allowed to cool in ambient surroundings. The outer collar of the hub, being significantly more massive than the diaphragm, takes more time to cool. As some shrinkage accompanies cooling, the continued shrinkage of the outer collar after the diaphragm has cooled can induce compressive and tensile stresses into the diaphragm. As force in the diaphragm must be dependent only upon diaphragm deflection for optimum centering accuracy, these residual stresses, uncettain in direction, can interfere with the elastic bending force.

In the case of a disc module mounted to the spindle, the problems inherent with magnetic attraction can be avoided if the module is mounted to the spindle at the manufacturing site, prior to the recording of servo tracks. If a problem develops in the field, however, the spindle and pack must be returned from the user as a unit for rework or replacement, at significant expense and lost time.

SUMMARY OF THE INVENTION

The invention relates to an improved apparatus for centering a single disc and disc module with respect to a rotatable spindle. The apparatus includes a spindle rotatable on a central axis. A hub, adapted for centering on the spindle, includes as its circumferential edge a rigid collar, a centering means having a centering element extended from the hub center in a axially inward direction toward the spindle, and connecting means which join the collar and centering means. The connecting means is substantially rigid radially of the hub but deformable elastically to allow displacement of the centering element in the axial direction from a normal or unstressed position relative to the collar.

The apparatus includes a forcing means which acts substantially in the axial direction peripherally of the centering means and symetrically about said central axis to urge said collar axially inward toward a full seating against a collar-receiving surface portion of the spindle.

The spindle has a cup located at the spindle center and adapted to cradle the centering element. The cup surface extends radially outward a sufficient distance such that the centering element engages the guide cup surface whenever the hub is at least approximately centered on the spindle. The surface is slanted radially and axially inward so that it guides the centering element, once in contact therewith, toward the cup center responsive to the forcing means.

The cup is selectively positioned with respect to the collar-receiving surface, to require a selected amount of axial displacement of the centering element relative to the collar prior to full seating of the collar. The selected amount is less than an amount which would produce forces in said connecting means equal to the force of said forcing means.

A significant feature of the apparatus resides in the fact that a certain amount of connecting means deformation, herein diaphragm deflection, is required after the centering element is seated in the cup and before the collar is fully seated upon the collar-receiving surface of the spindle. In this manner, centering of the hub occurs subject only to minor frictional drag from heb tipping. Centering is complete before the occurrence of the substantial frictional force between the collar and spindle when fully engaged. In the preferred embodiment, the centering element is a steel centering ball having a hemispherical surface facing the spindle cup. The use of steel avoids the prior art problems of nicking and denting. Further, as contact between the steel centering ball and spindle cup takes place over a much smaller contiguous area as compared to the prior art matching cones, dust and other particles, rather than interfering with centering, are pulverized under the vastly increased pressure. In this manner the apparatus is self-cleaning.

The preferred embodiments of the invention involve yet further improvements. For example, the center of the centering element or ball can be positioned in axial alignment with the diaphragm. Consequently, forces directed through the centering element in the radial direction cannot produce bending moments upon the diaphragm. Acting directly through the diaphragm, these forces more effectively overcome any friction between the collar and spindle. A further improvement relates to the method of manufacturing the hub. After the hub is cast, an annular groove is formed in the collar adjacent to the outer edge of the diaphragm. This groove relieves stresses induced in the diaphragm by uneven cooling, and further protects the diaphragm from potential stresses induced in further manufacturing processes. The result is that flexure of the diaphragm depends almost entirely upon the forces induced by axial movement of the centering element. Residual stresses do not materially interfere with the desired force-deflection relationship.

A further improvement involves a clamping ring having therein an annular groove adjacent to the surface of the disc to be clamped against the hub. Due to the groove and positioning of the clamping ring disc-engaging surface, the tendency in the disc to deforme from a planar axial configuration upon clamping is avoided.

IN THE DRAWINGS

Other features and advantages of the invention will become apparent upon reading the following detailed description and upon reference to the drawings, in which.

DETAILED DESCRIPTION OF PREFERRED EMBODIMENTS

Figure 1:
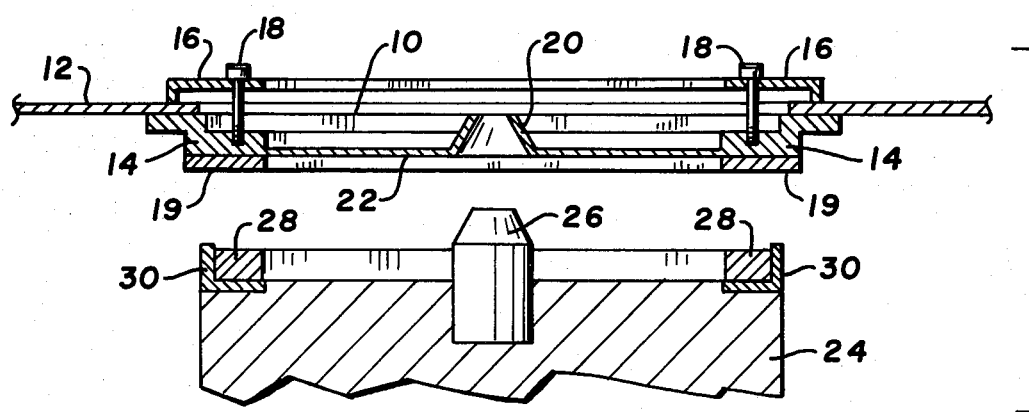
FIG. 1 is a diagrammatical view of a prior art device for centering a disc on a rotatable spindle.
Figure 2:
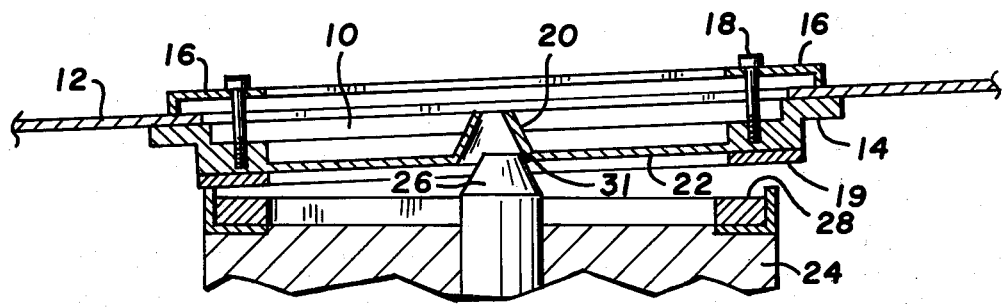
FIG. 2 is a diagrammatical view of the device of FIG. 1 illustrating inaccurate centering.

Turning to FIGS. 1 and 2 of the drawing, there is shown a prior art device for rotatably driving a disc on a spindle assembly. A hub assembly carrying the disc includes an aluminum cast hub 10 upon which a disc 12 is fixed. The inner rim of disc 12 is seated against a collar 14 of hub 10 by an annular clamp 16 secured to the collar by a plurality of bolts 18. An annular soft iron armature plate 19 is secured to the opposite surface of collar 14. A female hub centering cone 20, shaped as a truncated cone, is positioned in the center of hub 10. The female cone and collar 14 are joined by a flexible diaphragm 22.

The spindle assembly includes an aluminum spindle 24 having mounted at its center a male steel centering cone 26. Cone 26 is shaped for generally contiguous contact with female cone 20 of the hub. The spindle assembly further includes a permanent magnet 28 around the spindle periphery. Also at the periphery and surrounding the magnet is a soft iron pole piece 30.

Under ideal conditions, cones 20 and 26 are joined in face to face contact with one another. A slight amount of flexure or bending in diaphragm 22 permits armature plate 19 to contact pole piece 30 around the entire circumference of the hub and spindle.

To overcome the force produced by bending of the diaphragm and insure the positive frictional contact necessary to impart rotation to the hub from the spindle, a strong magnetic force is necessary. One problem caused by the strength of the magnetic force is illustrated in FIG. 2, where the left end of the hub as shown in FIG. 2 has contacted the spindle prior to complete centering between cones 20 and 26. Female cone 20, being aluminum, is particularly vulnerable to nicking from the male cone as illustrated herein at point 31. Further damage can result if any foreign particles are trapped between the two cones. Even though there may be no damage, the fact that the cones contact one another over a relatively large area results in a contact pressure, over the contiguous area, is sufficient to remove or pulverize any dust particles trapped between the cones. Thus they remain to interfere with centering accuracy.

Figure 3:
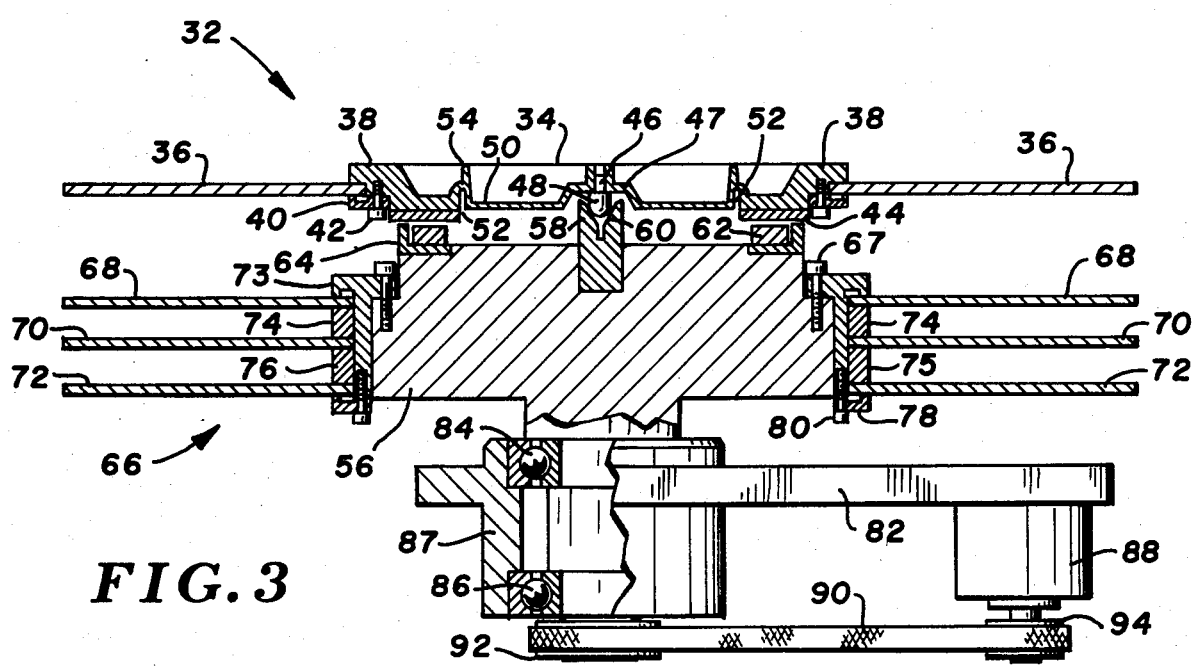
FIG. 3 is an elevational view of an apparatus according to the invention for centering a hub with respect to a spindle.

FIG. 3 illustrates an apparatus in accordance with the present invention to more accurately and reliably center a disc with respect to a rotatable spindle. A disc drive apparatus 32 includes a hub assembly having an aluminum die cast hub 34 on which is mounted a disc 36. Disc 36 is attached to a rigid outer rim or collar 38 by a grooved clamping ring 40 attached to collar 38 by a series of clamping bolts 42. An armature plate 44 of magnetizable material is attached to collar 38. At the rotational center of hub 34 is an elongated steel centering peg 46 mounted within a housing 47. A centering element or ball 48 has a hemispherical surface which is in contact with spindle centering cup 58 whenever hub 34 is positioned on the spindle. A flexible diaphragm 50 joins housing 47 and collar 38. Diaphragm 50 is substantially rigid in the radial direction with respect to the hub. However, it is bendable to allow centering peg 46, and thus centering ball 48, to move in either axial direction away from a normal or unstressed position with respect to collar 38. An upright groove 52 is machined into the collar near the diaphragm and runs the circumferencial length of the collar. An inner rim 54 adds structural stiffness near groove 52.

The spindle assembly includes a spindle 56 rotatable about a central axis and having at its center a centering cup 58. Cup 58 has a central base 60 adapted to cradle centering ball 48 when the hub and spindle are joined. A permanent magnet 62 is attached at the periphery of spindle 56. A pole piece 64 of soft iron is attached adjacent to the magnet. A disc module or disc pack 66 is shown attached to spindle 56 by a plurality of module clamping bolts 67. The module includes first, second and third module discs 68, 70 and 72 respectively. The module discs are contained between an outer flange 73 of a module hub 75, first and second spacers 74 and 76, and a module clamping ring 78 attached to the module hub by a plurality of clamping ring bolts 80. The module and spindle are rotatable with respect to a base 82. An upper bearing assembly 84 and the lower bearing assembly 86 mount the spindle with respect to a spindle arbor 87. A motor 88 rotates the spindle via a belt 90 which drivably associates a spindle pulley 92 and a motor pulley 94. By selectively operating motor 88, the module discs can be placed in any desired rotational position while a read and record head positionable with respect to each disc, is moved to the desired radial location. In this manner a desired portion of the disc surface area can be reached for reading or recording.

In FIG. 3, hub 34 is shown in its fully mounted position. Centering ball 48 is fully cradled within cup 58, and armature plate 44 is fully seated against pole piece 64. In this position there is slight flexing of the diaphragm downward and radially outward. A purpose of the flexure requirement is to insure that so long as the diaphragm is unstressed, centering ball 48 becomes fully seated in base 60 before armature plate 44 can become fully seated against pole piece 64. Hence, substantial contact between the armature plate and pole piece can not interfere with proper centering, for example by providing radial friction forces sufficient to resist movement of the hub to its centered position. It has been found that the preferred amount of diaphram flexure in full engagement is that which displaces ball 48 0.009 inches axially from its zero force position with respect to collar 38. This varies with the geometry of the apparatus. The range of permitted displacement is between that creating force sufficient to overcome such friction, and that creating a force as great as the magnetic attraction.

A notable feature of hub 34 is the positioning of centering ball 48 with respect to diaphragm 50. The center of the centering ball is axially aligned with the diaphragm. Because the ball surface is hemispherical, forces due to contact between the ball and cup 58, which forces act normal to the ball surface, are directed through the ball center. This is particularly important with respect to the radial components of these contact forces. These radial forces, (horizontal as viewed in FIG. 3), were they axially spaced from the plane of diaphragm 50, would create a bending moment about the diaphragm, resulting in a reduced radial stiffness between centering ball 48 and collar 38. The reduced radial stiffness results in a higher degree of off center engagement.

Figure 4:
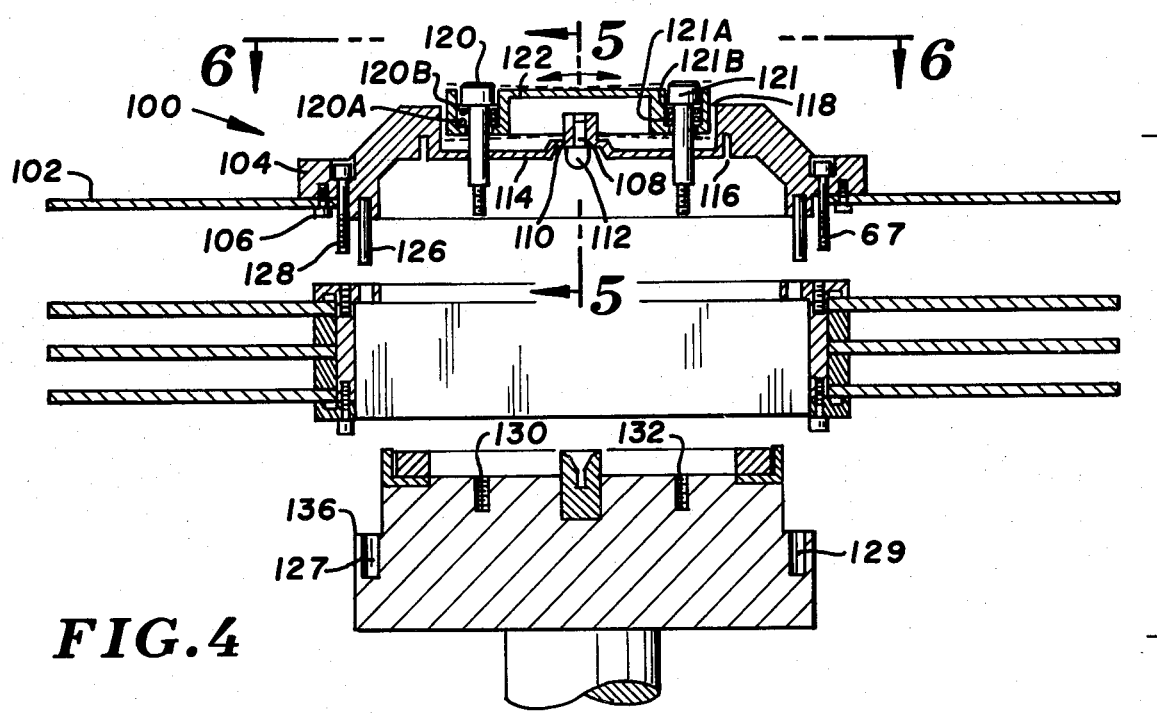
FIG. 4 is an elevational sectional view of a tool and disc module attachable thereto for mounting to a rotatable spindle.
Figure 5:
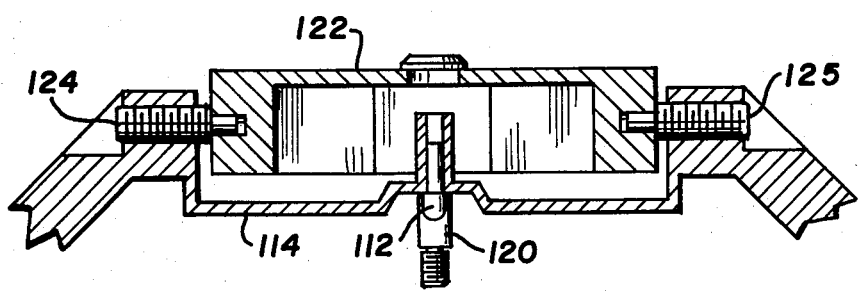
FIG. 5 is an enlarged sectional view taken along the line 5—5 in FIG. 4.
Figure 6:
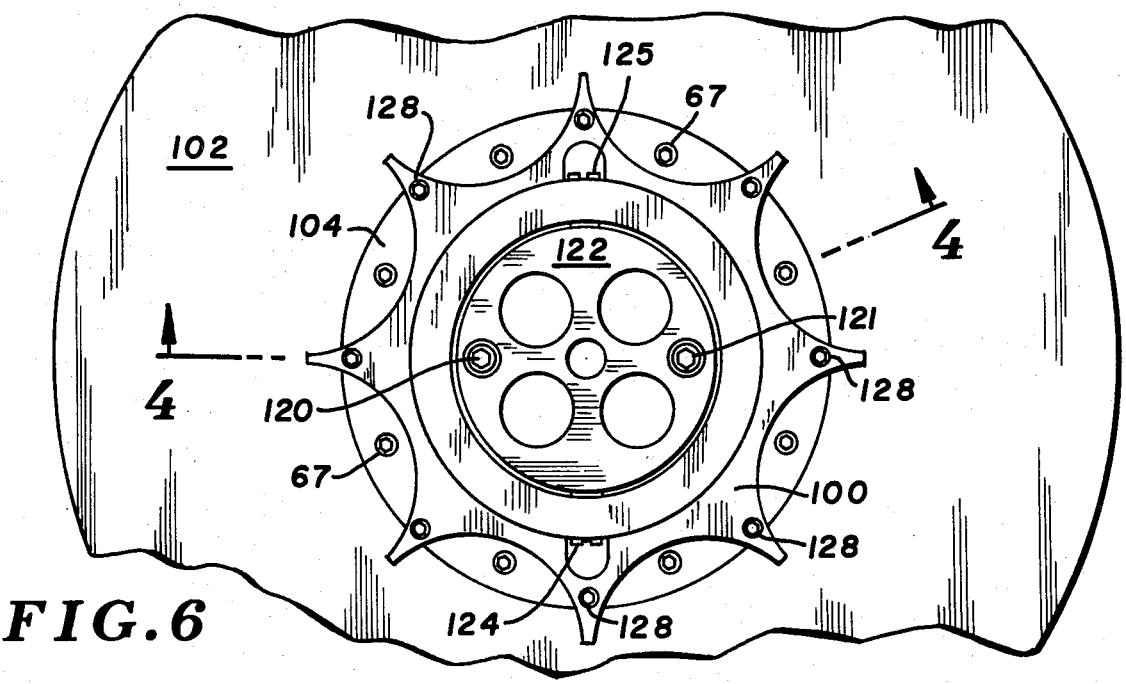
FIG. 6 is a top view of the tool jig as viewed along the line 6—6 in FIG. 4.

FIGS. 4, 5 and 6 illustrate an alternative embodiment of the centering device, wherein the hub assembly is in the form of a tool 100. A dust-cover disc 102 is attached to the tool at an outer rim 104 by a plurality of bolts 106. A centering means at the center of tool 100 includes a steel centering peg 108 press fit into a housing 110. A centering element or ball 112 protrudes from the tool in an axially inward direction toward the spindle. A diaphragm 114 connects the housing 110 with collar 104. Diaphragm 114 in the tool functions in a similar manner as did diaphragm 50 in the single disc hub. That is, while diaphragm 114 is stiff in the radial direction, it is bendable to allow centering ball 112 to move in either axial direction with respect to collar 104. A groove 116 is machined into collar 104 near the outer circumference of the diaphragm.

A first shoulder screw 120 and a second shoulder screw 121 are each extended through an oversized opening in a centering plate 122. A first compression spring 120A contained by a first washer 120B and a second compression spring 121A contained by a second washer 121B, absorb forces between their respective shoulder screws and the centering plate to dampen its response to either screw. Plate 122 is pivotally connected to tool 100 by first and second pivotal dog set screws 124 and 125. Set screws 124 and 125 form a pivot axis normal to the tool axis of rotation. As perhaps best understood by viewing FIGS. 4, 5 and 6 in combination, a straight line passing through shoulder screws 120 and 121 would be perpendicular to the pivot axis formed by dog set screws 124 and 125, and further would intersect the central axis. Shoulder screws 120 and 121 are equidistant from the pivot axis. Two plastic alignment pins 126 are positioned for generally aligning tool jig 100 with spindle 56. A series of tool bolts 128 are provided to connect the tool to module hub 75. First and second threaded openings 130 and 132, respectively are provided in spindle 56 for receiving shoulder screws 120 and 121.

In practice, tool 100 is first mounted to disc module 66. The tool and disc module, as one assembly, are then subjected to the normal manufacturing processes of balancing, writing of servo tracks and error testing-formatting. The assembly is then centered on the spindle by tightening shoulder screws 120 and 121 into threaded openings 130 and 132 of spindle 56. The tightening of screws 120 and 121 provides an attractive force between tool 100 and spindle 56 which, with centering ball 112 in cup 58, tends to draw ball 112 downward and toward the center of the cup. This arrangement insures that the resultant of the forces caused by the shoulder screws (120,121) passes through the spindle rotational axis. This, in turn allows the tool 100 to center itself on the spindle centering cup 58 before frictional forces can be developed between the module hub 75 and spindle flange 136. While in theory it would be possible to use a plurality of shoulder screws such as 120 and 121 without a centering plate such as 122, exactly simultaneous tightening of all screws would be necessary, given the strict tolerance of centering required. It has been found that without centering plate 122, forces induced in the hub and centering peg from uneven shoulder-screw tightening prevent accurate centering.

Tightening of screws 120 and 121 is continued until module hub 75 is brought into full seating or face to face engagement with spindle ledge 136. At this point, the tool tool-module assembly and spindle are held together firmly and in centered relation.

With tool 100 centered and the shoulder screws completely tightened, clamping bolts 67 are tightened into threaded apertures in spindle 56. Module clamping bolts 67 are mounted in module 66 free of tool 100 and in oversized openings in hub 75 to allow lateral or radial movement relative to the module hub during centering. With all module clamping bolts tightened, tool bolts 128 are released to separate 100 from module 66. This leaves the module connected to spindle 56 and exactly centered.

A principal advantage of tool 100 is that it enables on-site replacement of a module. The prior art required shipment of the module and the spindle as a unit back to the manufacturing facility for rework or replacement. Tool 100 enables servo tracks to be written with the module centered on the tool. The tool-module assembly is later centered on the spindle at the user's location, and the tool alone removed. Thus, a significant amount of time and labor is saved whenever a defective module must be replaced or repaired. Once removed from a centered module, the tool is ready for connection and processing with another module.

Figure 7:
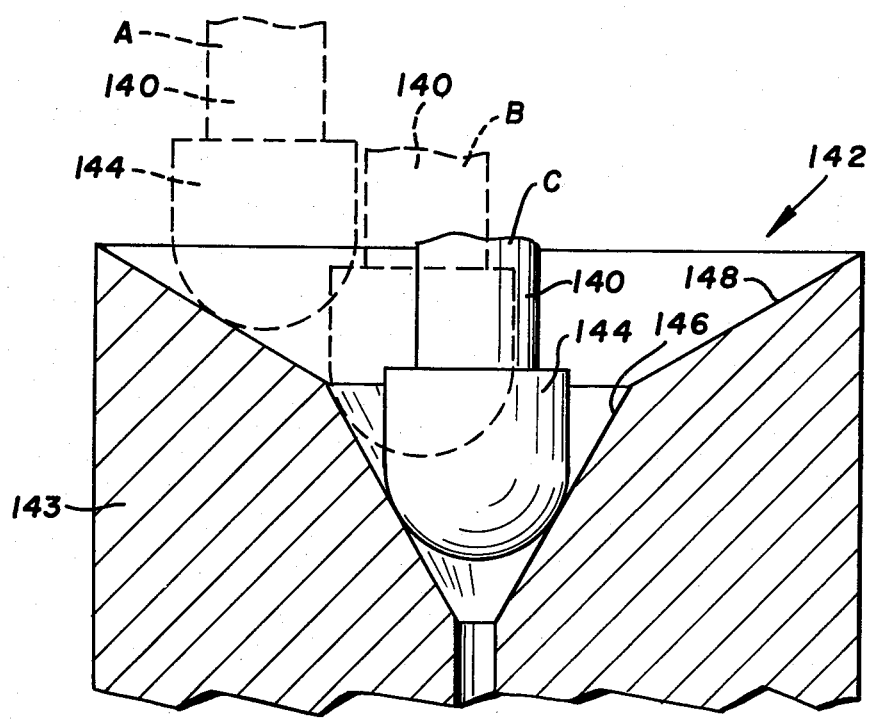
FIG. 7 is a schematic view illustrating the progress of a centering element of the apparatus toward a centered position.

FIG. 7 schematically shows the operation of the centering ball and cup. A centering peg 140, which could be part of either a hub as in FIG. 3 or a tool as in FIG. 4, is shown in broken lines at A and B, and in solid lines as centered at C within a centering cup 142. During centering, a centering ball 144 of peg 140 contacts the inside surface of cup 142, which is illustrated in an embodiment particularly advantageous in conjunction with the magnetic attraction between the hub and spindle. The inside surface inpart provides a base 146 adapted to cradle centering ball 144 once the ball has reached its centered position. Cup 142 further includes a guide surface 148 extending radially and axially outward from the base. The base is inclined at an angle of 30 degrees from the central axis, while the guide surface is inclined at an angle of 60 degrees. The steeper slope of base 146 ensures positive cradling. The comparatively gentle slope of the guide surface enables a wider capture range so that even approximate manual centering places ball 144 within the cup.

The sequence of hub centering is illustrated in steps showing the centering peg and ball in broken lines at A and B, and in solid lines in the cradled or centered position at C. The conditions necessary to initiate centering are that centering ball 144 be in contact with cup 146, and that the attractive forcing means (e.g., the magnet or shoulder screws) be operative in drawing the hub assembly axially inward toward spindle 143. Contact with the cup is insured by its size or capture range, and by tolerances in the drive apparatus casing sufficiently close to place ball 144 within the capture range upon manual, approximate centering. The forcing means is present immediately upon manual positioning in the case of the magnet; and with the shoulder screws, is created as they are threadedly turned into spindle 143.

The shape of cup 146 has been found advantageous, particularly in connection with a forcing means such as a magnet having a force proportional to the inverse square of the distance between it and the armature plate. Base 146 is conically shaped with a slope of 30 degrees from the central axis, defining an overall angle of 60 degrees. The slope angle and overall angle of guide surface 148 measure 60 degrees and 120 degrees, respectively.

The advantage of the dual-slope surface of cup 146 can be understood from the sequence of centering. Initial ball contact with cup 146 is shown at position A, on guide surface 148 having a comparatively gradual slope. Contact force, i.e., the force of the guide surface counter to gravity and the forcing means, acts perpendicular to the guide surface and thus acts through the center of ball 144. At this point the ball-centering radial component of the contact force (horizontal in FIG. 7) is comparatively small. However, a small centering force is sufficient as the armature plate and magnet are sufficiently remote to avoid premature off-center engagement. Even though the hub may tip and cause some armature-pole piece contact, no material frictional drag is produced.

As the ball and peg reach position B, the armature and magnet are nearer and the potential for frictional drag is significantly increased. Of course the magnetic attraction has similarly increased. More important, however, is that ball 144 at B contacts base 146, and the contact force thus acts normal to the comparatively steep surface. The radial centering component is larger relative to the total contact force, having increased from approximately half to approximately eighty-seven percent of the total. In short, by the time friction is potentially a problem, the centering force is strong enough to overcome it.

When centered at position C, contact forces are radially balanced to firmly cradle ball 144 within base 146. As understood from FIG. 7, the contiguous area is annular and narrow. The greatly reduced contiguous area as compared to the prior art cones, results in a greatly increased contact force per unit area. In fact, the pressure is such that foreign particles trapped between the steel ball and cup are pulvarized and thus can not interfere with centering. In this manner the apparatus is self cleaning.

Figure 8:
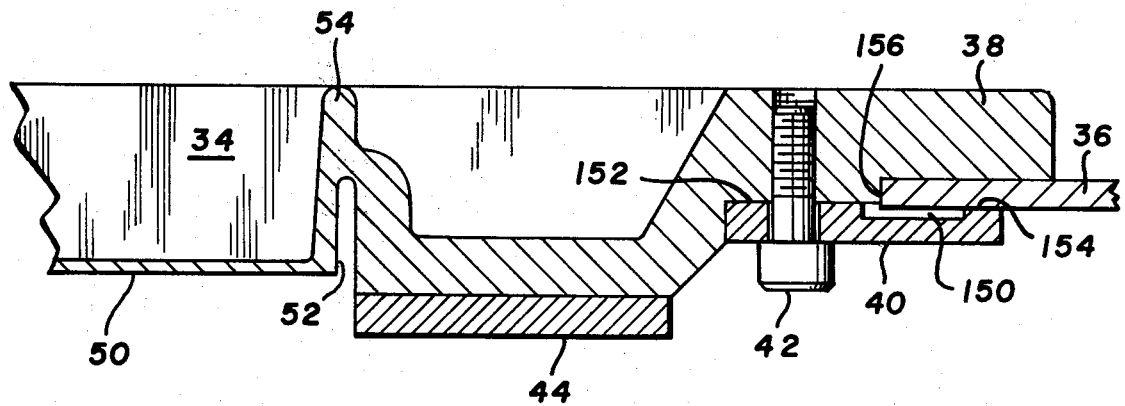
FIG. 8 is an enlarged partial view of FIG. 3, with parts removed to enhance clarity in illustration.

FIG. 8 shows part of hub 34 to reveal groove 52 and rim 54 in greater detail. The purpose of groove 52 arises from the method of manufacturing the hub, i.e., aluminum die casting. As the collar is quite massive compared to the diaphragm, the diaphragm cools more rapidly. Shrinkage accompanies cooling, and hence the collar continues to shrink after the diaphragm has substantially cooled. This introduces stresses, principally compressive, into the diaphragm. Subsequent processing of the hub can introduce additional stresses, all of which combine to interfere with the desired force-deflection relationship in the diaphragm and thus interfere with centering accuracy.

Hub 34 is originally cast without groove 52. After the hub cools, however, a lathe and cutting tool is used to cut the groove into collar 38 near the circumference of diaphragm 50. The machining relieves the internal stresses created by the uneven cooling, and further prevents the accumulation of internal stresses during subsequent processing of the hub. The result is that diaphragn 50 responds more predictably to the axially-applied forcing means and ball-cup contact force, which itself is axial once the ball is centered.

Shown in detail in FIG. 8 is clamping ring 40, including an annular groove 150 between a hub contact surface 152 and a narrower disc contact surface 154. Disc 36 is positioned against a step 156 of the collar having a width slightly less than that of the disc thickness. Consequently, with surface 154 contacting the disc, clamping ring 40 bends elastically as tightening of bolt 42 brings surface 152 against the collar. The clamping force through surface 154 is generally centered with respect to clamping forces through an outer flange of the collar, an arrangement which maintains disc 36 in the desired axial plane.

Thus, significant improvements in centering accuracy and repeatability are achieved using the apparatus disclosed. The ball-cup interface directs the centering force through the ball center and thus to the collar directly through the diaphram. Ball movement is thus translated substantially instantaneously to the collar, enabling it to move efficiently to the centered position. The flexing required of the diaphragm enables centering of the ball before any significant collar-spindle friction can develop. The groove machined into the collar insures the desired force-deflection relationship in the diaphragm. Finally the steel cone and cup insure durability and enable self cleaning.

What is claimed is:

1. Apparatus for mounting a hub on a spindle, including:

a rotatable hub, said hub including a circumferencial collar, a centering element at the hub center and extended axially thereof, and connecting means for maintaining said collar in a normal position with respect to said centering element;

a spindle rotatable on a central axis;

means defining a collar-receiving surface integral with said spindle;

a forcing means for urging said collar axially inward toward a full seating against said collar-receiving surface;

means defining a cup in said spindle centered on said central axis and extended radially outward therefrom so as to engage said centering element whenever said hub is at least approximately centered on said spindle, the surface of said cup being inclined radially inward and axially inward thereby to guide said centering element, when in contact therewith, toward said central axis responsive to said forcing means, and then to cradle said centering element once it is centered on said central axis;

said connecting means being substantially rigid radially of said hub, but deformable elastically so as to allow axial displacement of said collar from said normal position with respect to said centering element;

wherein said collar, after the cradling of said centering element, is displaced responsive to said forcing means axially inward from said normal position with respect to said centering element, thereby elastically deforming said connecting means prior to said full seating of said collar against said collar-receiving surface.

2. The apparatus of claim 1 wherein:
said connecting means includes a diaphragm intermediate said centering element and collar, said diaphragm elastically deformable from a normally planar configuration.

3. The apparatus of claim 2 including:
a housing at the hub center and a peg mounted in said housing and having at one end thereof said centering element, wherein said diaphragm, collar and housing comprise one piece.

4. The apparatus of claim 3 wherein:
the center of said centering element is axially aligned with the diaphragm.

5. The apparatus of claim 4 including:
means defining a groove in said collar running the circumferential length thereof and proximate the periphery of said diaphragm.

6. The apparatus of claim 1 wherein:
said centering element comprises a centering ball having a hemispherical surface directed toward the spindle.

7. The apparatus of claim 6 wherein:
the center of said centering ball is substantially in the plane of said diaphragm.

8. The apparatus of claim 7 wherein:
the surface of said cup has a steeply inclined base adapted to cradle said centering element at the center of the spindle, and a comparatively gradually inclined guide surface extended outward from the base a sufficient distance for engagement with said centering ball whenever the hub is at least approximately centered on said spindle.

9. The apparatus of claim 1 including:
a groove in said collar running the circumferential length thereof and spaced proximate said connecting means.

10. The apparatus of claim 1 wherein:
said forcing means acts peripherally of said centering element.

11. The apparatus of claim 10 wherein:
said forcing means comprises a permanent magnet attached to said spindle at the periphery thereof, and an armature plate mounted to the collar opposite said magnet and attracted thereto whenever said hub is at least approximately centered on said spindle.

12. The apparatus of claim 10 including:
a centering plate spaced apart from said connecting means and mounted to said hub for pivoting about a pivot axis normal to said central axis;
said forcing means comprising a plurality of screws spaced symmetrically about said centering element, each screw extended through an oversized opening in said centering plate and adapted to threadedly engage a corresponding opening in said spindle whereby tightening of said screws into said spindle draws said collar towards said full seating against said collar-receiving surface.

13. The apparatus of claim 12 including:
spring means between each screw and said plate for absorbing force between said plate and each said screw, and means for confining each spring means.

14. Apparatus for mounting one or more magnetic discs on a rotatable spindle including:
a spindle rotatable on a central axis, and means defining a hub-receiving surface on said spindle;
a hub adapted for supporting at least one magnetic disc;
a tool having a circumferential rim, a centering element at the tool center and extended axially thereof, and connecting means for maintaining said rim in a normal position with respect to said centering element;
releasable means for releasably mounting the rim of said tool to said hub to form a hub-tool assembly;
a forcing means for urging said hub-tool assembly axially inward toward a full seating of said hub against said hub-receiving surface;
means defining a cup in said spindle centered on said central axis and extended radially outward therefrom so as to engage said centering element whenever said hub-tool assembly is at least approximately centered on said spindle, the surface of said cup being inclined radially inward and axially inward thereby to guide the centering element, when a contact therewith, toward the central axis responsive to said forcing means, and then to cradle said centering element once it is centered on said central axis, whereupon said hub-tool assembly is centered on said spindle; and
fastening means for fastening said hub with respect to said spindle with said hub-tool assembly centered thereon, whereby subsequent release of said releasable means permits removal of said tool from said hub and spindle.

15. The apparatus of claim 14 wherein:
said rim, after the cradling of said centering element, is displaced responsive to said forcing means axially inward from said normal position with respect to said centering element, thereby elastically deforming said connecting means prior to said full seating of said hub.

16. The apparatus of claim 15 including:
a centering plate spaced axially from said connecting means and mounted to said hub for pivoting about a pivot axis normal to said central axis, said forcing means comprising a plurality of screws spaced symmetrically about said centering element, each screw extended through an oversized opening in said centering plate and adapted to threadedly engage a corresponding opening in said spindle whereby tightening of said screws into said spindle draws said rim towards said full seating against said hub-receiving surface.

17. The apparatus of claim 16 including:
spring means between each said screw and said plate for absorbing force between said plate and screw, and means for confining each spring means with respect to said plate.

18. For centering a magnetic disc on a spindle in a magnetic disc reading and recording device, apparatus including:
a spindle, means for defining a collar-receiving surface integral with said spindle, and means for driving said spindle rotatably about a central axis;
a rotatable hub adapted for carrying at least one magnetic disc, said hub including circumferential collar, a centering element at the hub center and extended axially thereof, and connecting means for maintaining said collar in a normal position with respect to said centering element, said connecting means being substantially rigid radially of said hub but deformable elastically so as to allow axial displacement of said collar from said normal position;
a forcing means for urging the collar axially inward toward a full seating against said collar-receiving surface;
means defining a cup in said spindle centered on said central axis and extended radially outward therefrom so as to engage said centering element whenever said hub is at least approximately centered on said spindle, the surface of said cup being inclined radially inward and axially inward thereby to guide said centering element, when in contact therewith, toward said central axis responsive to said forcing means, and then to cradle said centering element once it is centered on said central axis;
wherein said collar, after the cradling of said centering element, is displaced responsive to said forcing means axially inward from said normal position, thereby elastically deforming said connecting means prior to said full seating of the collar.

19. The apparatus of claim 18 wherein:
said connecting means includes a diaphragm intermediate said centering element and collar, said diaphragm elastically deformable from a normally planar configuration.

20. The apparatus of claim 19 including:
a housing at the hub center and a peg mounted in said housing and having at one end thereof said centering element, said diaphragm, collar and housing comprising one piece.

21. The apparatus of claim 20 wherein:
the center of said centering element is substantially in the plane of said diaphragm.

22. An apparatus for mounting a magnetic disc to a central hub, including:
an annular hub having a circumferential collar including a flange positionable against an inner rim of said magnetic disc, and a step projected axially from said flange a distance less than the thickness of said disc;
an annular clamping ring having a hub contact surface positionable against said step, a disc contact surface positionable against said inner rim and generally radially centered with respect to the contiguous area between said flange and disc, and means defining an annular groove in said clamping ring between said disc contact and hub contact surfaces; and
means for fastening said clamping ring to said hub adapted to maintain said hub contact surface in engagement with said disc thereby causing said ring to deflect along said groove with said disc contact surface engaged with said disc.

* * * * *

UNITED STATES PATENT AND TRADEMARK OFFICE
CERTIFICATE OF CORRECTION

PATENT NO. : 4,224,648
DATED : September 23, 1980
INVENTOR(S) : William J. Roling It is certified that error appears in the above—identified patent and that said Letters Patent is hereby corrected as shown below:

On the Title page, after "Assignee:" delete "Control Data Corporation" and insert --Magnetic Peripherals Inc.--

Signed and Sealed this

Nineteenth Day of May 1981

[SEAL]

Attest:

RENE D. TEGTMEYER

Attesting Officer

Acting Commissioner of Patents and Trademarks